(12) United States Patent
Kyoo (10) Patent No.: US 9,554,004 B2
(45) Date of Patent: Jan. 24, 2017

(54) IMAGE PROCESSING SYSTEM (71) Applicant: Konica Minolta, Inc., Chiyoda-ku, Tokyo (JP)

(72) Inventor: Shunsaku Kyoo, Hyogo-ken (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 14/499,881

(22) Filed: Sep. 29, 2014

(65) Prior Publication Data

US 2015/0092232 A1 Apr. 2, 2015

(30) Foreign Application Priority Data

Oct. 1, 2013 (JP) .................................. 2013-206415

(51) Int. Cl.
H04N 1/00 (2006.01)
H04N 1/23 (2006.01)
H04L 29/08 (2006.01)

(52) U.S. Cl.
CPC .......... *H04N 1/00408* (2013.01); *H04L 67/06* (2013.01); *H04L 67/24* (2013.01); *H04L 67/26* (2013.01); *H04L 67/36* (2013.01); *H04N 1/00244* (2013.01); *H04N 1/00384* (2013.01); *H04N 1/2376* (2013.01); *H04L 67/10* (2013.01); *H04N 2201/0094* (2013.01)

(58) Field of Classification Search
CPC ............ H04N 1/00408; H04N 1/00244; H04N 1/00384; H04N 1/2376; H04N 2201/0094; H04L 67/10; H04L 67/06; H04L 67/36; H04L 67/24; H04L 67/26

USPC ......................................................... 358/1.15
See application file for complete search history.

(56) References Cited

U.S. PATENT DOCUMENTS

| | | | |
|---|---|---|---|
| 6,384,926 B2 * | 5/2002 | Mochizuki ................... | 358/1.14 |
| 6,678,068 B1 * | 1/2004 | Richter et al. ............... | 358/1.15 |
| 6,829,619 B1 * | 12/2004 | Wakamatsu et al. | |
| 8,830,515 B2 * | 9/2014 | Hattori .................. | G06F 3/1203 358/1.14 |
| 2008/0174800 A1 * | 7/2008 | Kim ...................... | G06F 3/1294 358/1.9 |
| 2008/0180733 A1 | 7/2008 | Imamichi | |
| 2010/0088609 A1 | 4/2010 | Kawana | |
| 2010/0313261 A1 * | 12/2010 | Park .............................. | 726/11 |

(Continued)

FOREIGN PATENT DOCUMENTS

| | | | |
|---|---|---|---|
| JP | 2008141506 A | 6/2008 | |
| JP | 2010093532 A | 4/2010 | |

(Continued)

OTHER PUBLICATIONS

Japanese Notice of Grounds of Rejection corresponding to Patent Application No. 2013-206415; Mailed Aug. 25, 2015, with English translation.

*Primary Examiner* — Allen H Nguyen
(74) *Attorney, Agent, or Firm* — Cantor Colburn LLP (57) ABSTRACT

In the case where state information has already been obtained from a service providing server on the Internet at the time when an MFP requests access to the service providing server, a mediation server gives a notification using the MFP based on the state information. In this case, the mediation server switches a notification method between a method of displaying a view on a display panel of the MFP and other methods in accordance with a function of the MFP.

16 Claims, 9 Drawing Sheets

(56) References Cited

U.S. PATENT DOCUMENTS

2011/0267636 A1   11/2011  Kamasuka
2011/0299122 A1   12/2011  Kawakami
2012/0110065 A1*  5/2012  Oshima et al. ............... 709/203

FOREIGN PATENT DOCUMENTS

| JP | 2011035871 A | 2/2011 |
| --- | --- | --- |
| JP | 2011233031 A | 11/2011 |
| JP | 2011251513 A | 12/2011 |
| JP | 2012128667 A | 7/2012 |
| WO | 2012081662 A1 | 6/2012 |

* cited by examiner

FIG.9

IMAGE PROCESSING SYSTEM

CROSS REFERENCE

This application is based on Japanese Patent Application No. 2013-206415 filed with the Japan Patent Office on Oct. 1, 2013, the entire content of which is hereby incorporated by reference.

BACKGROUND OF THE INVENTION

Field of the Invention

The present disclosure relates to an image processing system, a mediation server, an image forming apparatus, and a notification method, and particularly to an image processing system, a mediation server, an image forming apparatus, and a notification method, for which service on the Internet can be utilized.

Description of the Related Art

Service on the Internet (also referred to as cloud service) has become available through an intra-corporate network including an image forming apparatus such as an MFP (Multi-Functional Peripheral). Examples of how to use such service are: uploading a document obtained by scanning using an image forming apparatus to a server on the Internet (Scan-To-Cloud); printing a document stored in a server on the Internet with the designated image forming apparatus (Follow-Me-Print); and the like.

The service on the Internet is independent of the intra-corporate network. Accordingly, there may also be a case where the service is not working when a user wants to use the service in such a way as described above. Therefore, it is important to give a notification of the service status.

SUMMARY OF THE INVENTION

The present disclosure has been made in light of the above-described problems. An object of the present disclosure is to provide an image processing system, for which service on the Internet can be utilized, and capable of accurately notifying a user of the image processing system about a status of providing the above-described service.

According to one embodiment, an image processing system is constructed of an intranet and includes at least one image forming apparatus that can be connected to the Internet through a mediation server. The image processing system includes: an obtaining unit for the mediation server to obtain state information from a service providing server on the Internet, the service providing server being recorded in advance; a request unit for issuing a request from the image forming apparatus to the mediation server according to an instruction from a user to access the service providing server on the Internet; and a notification unit for the mediation server to give a notification using the image forming apparatus based on the state information that has already been obtained from the service providing server at a time when the request was accepted from the image forming apparatus. The notification unit includes a switching unit for switching a method of the notification between a method of displaying a view on a display panel mounted in the image forming apparatus and other methods in accordance with a function of the image forming apparatus.

According to another embodiment, a mediation server serves to connect the Internet and an image processing system constructed of an intranet and including at least one image forming apparatus. The mediation server includes: an obtaining unit for obtaining state information from a service providing server on the Internet, the service providing server being recorded in advance; a request input unit for accepting a request from the image forming apparatus to access the service providing server on the Internet; and a notification unit for giving a notification using the image forming apparatus based on the state information that has already been obtained from the service providing server at a time when the request was accepted from the image forming apparatus. The notification unit includes a switching unit for switching a method of the notification between a method of displaying a view on a display panel mounted in the image forming apparatus and other methods in accordance with a function of the image forming apparatus.

Preferably, as one of the other methods, the notification unit creates a document based on the state information and causes the image forming apparatus to print the document when the notification unit does not have a control code for displaying a view on the display panel of the image forming apparatus.

Preferably, as the method of displaying a view on the display panel, the notification unit causes the display panel to display, differently from other buttons, a button for selecting the function of the image forming apparatus related to service that the service providing server stops providing, the button being displayed on the display panel, based on the state information.

Preferably, the notification unit further includes an instruction unit for accepting, in addition to the notification, an instruction to delete a document to be uploaded that has already been accepted, when the request is to upload the document to the service providing server.

According to another embodiment, an image forming apparatus includes a function of the mediation server.

According to another embodiment, a notification method is to give a notification about a state of a service providing server on the Internet in an image processing system constructed of an intranet and including at least one image forming apparatus that can be connected to the Internet through a mediation server. The notification method includes the steps of: obtaining, by the mediation server, state information from the service providing server on the Internet, the service providing server being recorded in advance; issuing a request from the image forming apparatus included in the image processing system to the mediation server according to an instruction from a user to access the service providing server on the Internet; and giving, by the mediation server, a notification using the image forming apparatus based on the state information in a case where the state information has already been obtained from the service providing server at a time when the request was accepted from the image forming apparatus. The step of giving a notification includes switching the notification method between a method of displaying a view on a display panel mounted in the image forming apparatus and other methods in accordance with a function of the image forming apparatus.

Preferably, as one of the other methods, the step of giving a notification includes printing, by the image forming apparatus, a document based on the state information and created in the mediation server when the mediation server does not have a control code for displaying a view on the display panel of the image forming apparatus.

Preferably, as the method of displaying a view on the display panel, the step of giving a notification includes causing the display panel to display, differently from other buttons, a button for selecting a function of the image forming apparatus related to service that the service providing server stops providing, the button being displayed on the display panel, based on the state information.

Preferably, the step of giving a notification includes the step of accepting an instruction to delete a document to be uploaded that has already been accepted, when the request is to upload the document to the service providing server.

Preferably, in the image processing system, a function of the mediation server is mounted in at least one of the image forming apparatuses.

According to another embodiment, a non-transitory computer-readable storage medium stores a program causing a computer to perform a process of giving a notification about a state of a service providing server on the Internet, the computer executing a mediation process for connecting the Internet and an image processing system constructed of an intranet and including at least one image forming apparatus. The program causes the computer to perform the steps of: obtaining state information from the service providing server on the Internet, the service providing server being recorded in advance; accepting a request from the image forming apparatus to access the service providing server on the Internet; and giving a notification using the image forming apparatus based on the state information in a case where the state information has already been obtained from the service providing server at a time when the request was accepted from the image forming apparatus. The step of giving a notification includes switching a method of the notification between a method of displaying a view on a display panel mounted in the image forming apparatus and other methods in accordance with a function of the image forming apparatus.

Preferably, as one of the other methods, the step of giving a notification includes printing, by the image forming apparatus, a document based on the state information and created in the mediation server when the mediation server does not have a control code for displaying a view on the display panel of the image forming apparatus.

Preferably, as the method of displaying a view on the display panel, the step of giving a notification includes causing the display panel to display, differently from other buttons, a button for selecting a function of the image forming apparatus related to service that the service providing server stops providing, the button being displayed on the display panel, based on the state information.

Preferably, the step of giving a notification includes the step of accepting an instruction to delete a document to be uploaded that has already been accepted, when the request is to upload the document to the service providing server.

Preferably, the computer is mounted in at least one of the image forming apparatuses.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be hereinafter described with reference to the accompanying drawings. In the following description, the same parts and components are designated by the same reference characters. Names and functions thereof are also the same. Accordingly, detailed description thereof will not be repeated.

<System Configuration>

Figure 1:
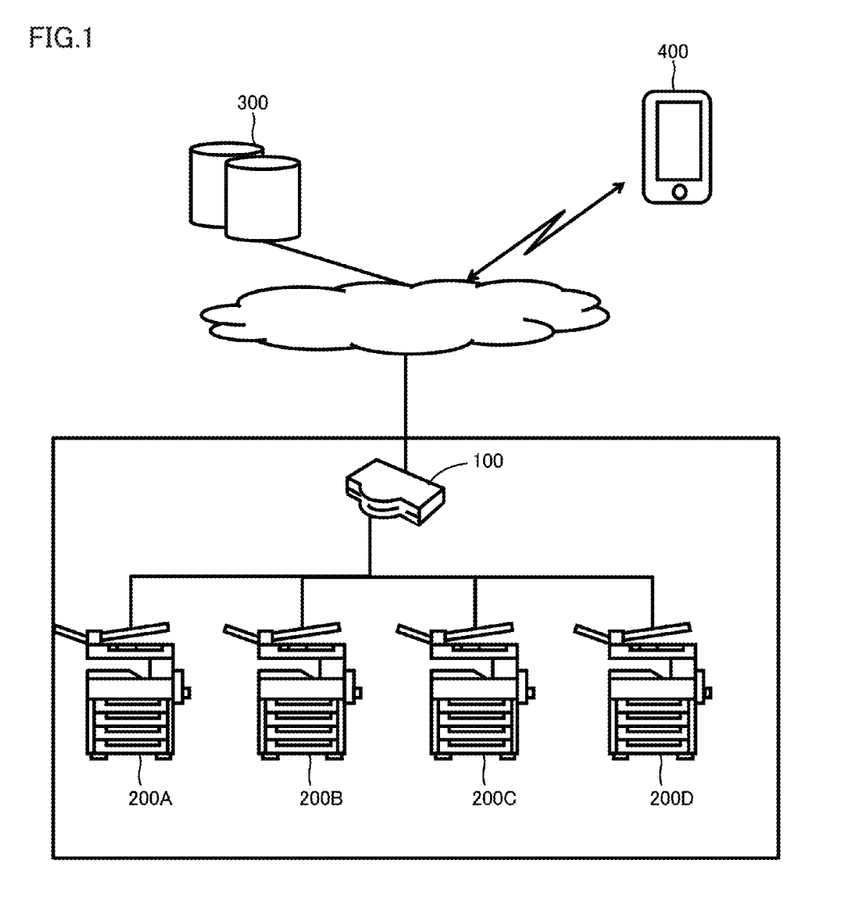
FIG. 1 is a diagram showing an example of the configuration of an image processing system (which will be hereinafter referred to as a system) according to an embodiment.

FIG. 1 is a diagram showing an example of the configuration of an image processing system (which will be hereinafter referred to as a system) according to the present embodiment. Referring to FIG. 1, the present system includes: a mediation server 100; and a plurality of MFPs (Multi-Functional Peripherals) 200A to 200D (which will be representatively referred to as an MFP 200) as an example of an image forming apparatus, which are electrically connected to mediation server 100. The present system serves as a system constructed in a specific area, such as an intra-corporate LAN (Local Area Network), for example, and corresponds to: a system using a protocol not conforming to the Internet; a system using a protocol conforming to the Internet and referred to as a so-called intranet; and the like.

Mediation server 100 mediates communication through the Internet between an internal device included in the present system and an external device not included in the present system.

Each client device can employ the application functioning in cooperation with the Internet. Accordingly, in the case where the present system serves as a system using a protocol conforming to the Internet and referred to as an intranet, the present system poses a risk of permitting an external device to easily intrude into the present system. In other words, the present system poses a risk of permitting unauthorized access from an external device to an internal device, transmission of a computer virus, and the like. Thus, mediation server 100 is disposed in the boundary position between the present system and the Internet, and functions as a so-called gateway. Preferably, mediation server 100 further functions also as a firewall.

For example, the present system can be constructed by connecting a plurality of MFPs installed in the office to mediation server 100. MFP 200 has a function of performing a process in cooperation with the function provided by the service providing server (which will be hereinafter referred to as a server) on the Internet. This function includes: a function of designating a document stored in a server on the Internet and printing the designated document (Follow-Me-Print); a function of uploading a document obtained by scanning to a server on the Internet (Scan-To-Cloud); and the like.

When accepting an instruction from a user, MFP 200 issues, to mediation server 100, a request to access a server 300. In the case where MFP 200 accepts an instruction of Follow-Me-Print, it issues, to mediation server 100, a request to obtain a document that is a target of Follow-Me-Print. In this case, mediation server 100 starts the application for executing Follow-Me-Print that is installed in mediation server 100 itself. Then, mediation server 100 accesses server 300 designated by MFP 200, obtains a targeted document, and transfers the obtained document to MFP 200. When accepting an instruction of Scan-To-Cloud, MFP 200 transfers scan data that is a target of Scan-To-Cloud to mediation server 100. Mediation server 100 accesses the designated server 300 and stores the scan data from MFP 200.

It is assumed that the present system is used for the second user requested to operate MFP 200, for example by the first user who is out of office, to upload scan data to server 300, or to obtain the designated document from server 300 and print out the obtained document. The first user can access server 300 using a portable terminal 400 to view the scan data uploaded to server 300 or can upload a document, which is to be printed out by an intra-office system, to server 300 using portable terminal 400.

<Device Configuration>

Figure 2:
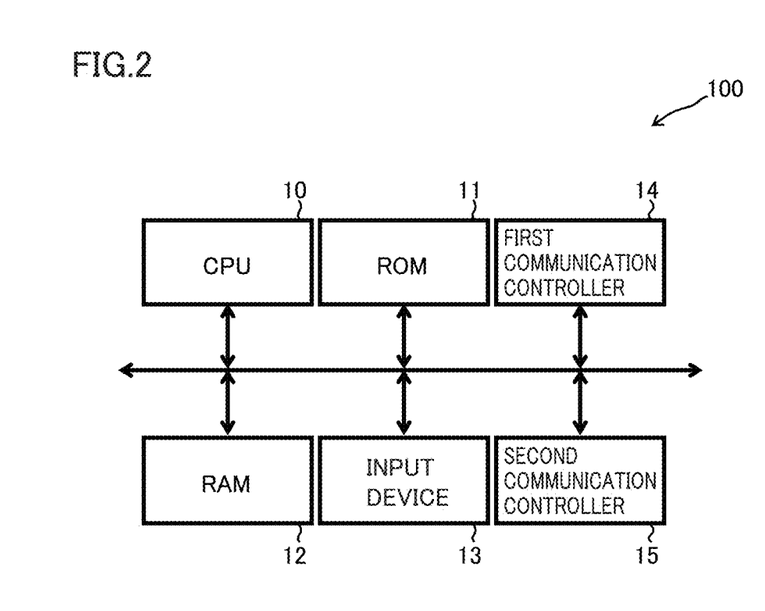
FIG. 2 is a block diagram showing an example of the device configuration of a mediation server included in the system.

FIG. 2 is a block diagram showing an example of the device configuration of mediation server 100. Mediation server 100 can be implemented by a commonly-used computer. Thus, FIG. 2 illustrates the configuration of a commonly-used computer.

Specifically, referring to FIG. 2, mediation server 100 includes: a CPU (Central Processing Unit) 10 for controlling the entire device; a ROM (Read Only Memory) 11 serving as a memory in which a program and the like executed by CPU 10 are stored; a RAM (Random Access Memory) 12 serving as a memory storing various pieces of information or used as a working space at the time when CPU 10 executes a program; an input device 13 such as a switch and a button; a first communication controller 14 for controlling communication within a system, that is, communication with an internal device; and a second communication controller 15 for controlling communication with an external device through the Internet.

Figure 3:
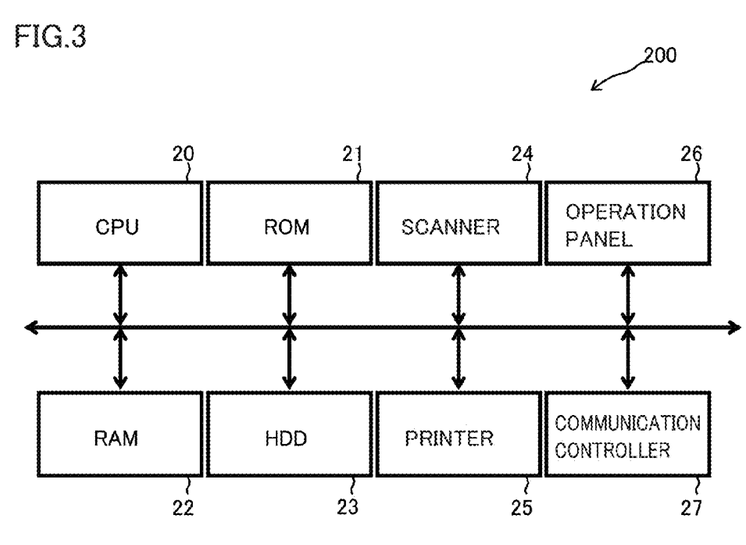
FIG. 3 is a block diagram showing an example of the device configuration of an MFP (Multi-Functional Peripheral) included in the system.

FIG. 3 is a block diagram showing an example of the device configuration of MFP 200. Referring to FIG. 3, MFP 200 includes: a CPU 20 for controlling the entire device; a ROM 21 serving as a memory in which a program and the like executed by CPU 20 are stored; a RAM 22 serving as a memory storing a value required for executing a program by CPU 20 or used as a working space at the time when a program is executed by CPU 20; an HDD (Hard Disk Drive) 23 serving as a storage device in which a document and the like are stored; a scanner 24; a printer 25; an operation panel 26; and a communication controller 27 for controlling communication within a system, that is, communication with an internal device.

<Operation Outline>

Figure 4:
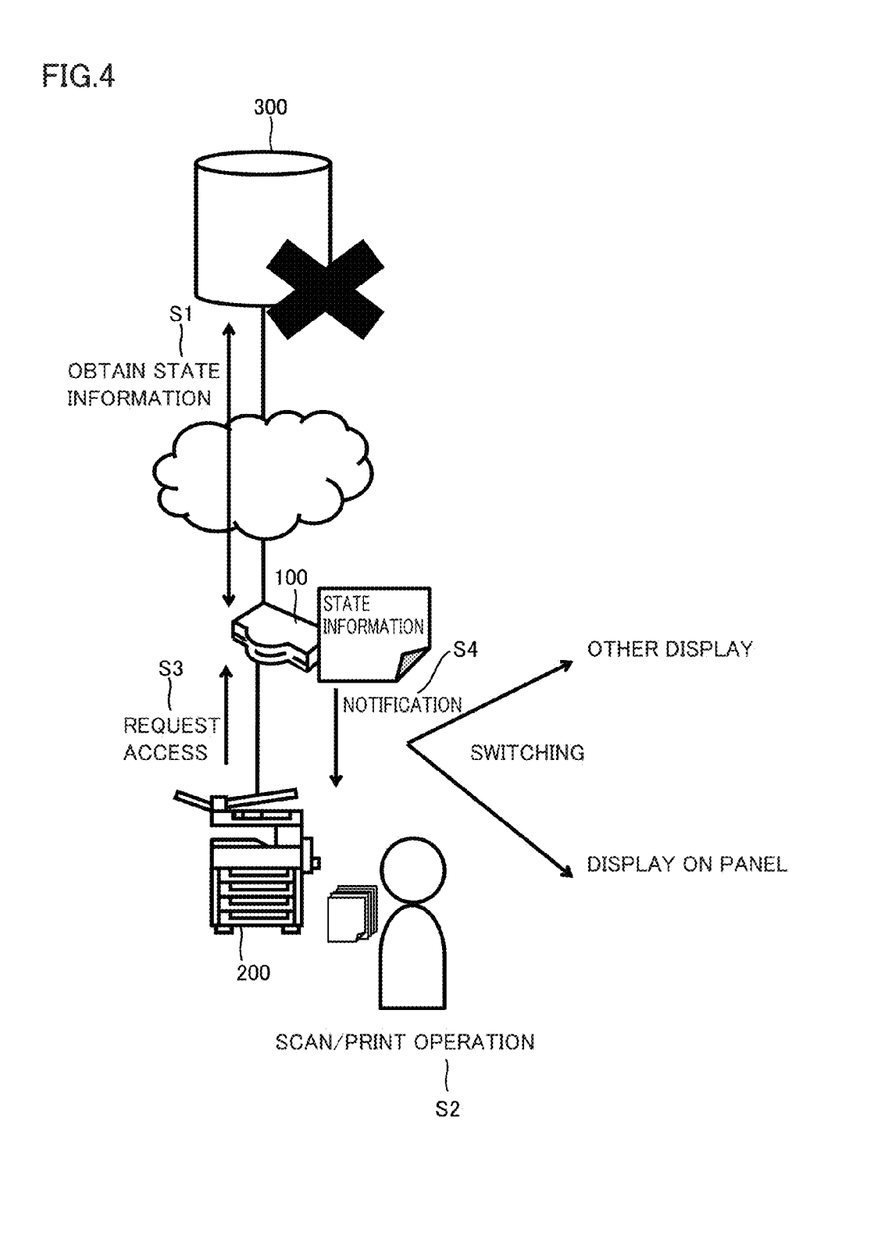
FIG. 4 is a diagram illustrating an operation outline in the system.

FIG. 4 is a diagram illustrating an operation outline in the present system. Referring to FIG. 4, mediation server 100 obtains state information from server 300 in a prescribed timing (step S1). The state information means information indicating the state that exerts an influence upon provision of service in server 300. The state information corresponds to the information indicating a schedule of a service discontinuation period and a schedule of a service interruption period (downtime), as well as the state that service is being discontinued or interrupted. Mediation server 100 accesses server 300 recorded in advance in a prescribed timing such as in a power-ON timing or at a reservation time, to obtain the state information of server 300 and store the obtained state information in the memory.

An example of the method for mediation server 100 to obtain the state information of server 300 may be a method for mediation server 100 to issue a request for state information to server 300, and receive the state information sent from server 300 in response to the request. Another example of the method may also be a method by which, when state information is set in (input to) server 300, server 300 notifies mediation server 100 recorded in server 300 in advance about the state information. Furthermore, the method for mediation server 100 to obtain state information of server 300 is not limited to the methods described above, but may be any method. Each of the methods is included in the process of obtaining state information in step S1 described above.

When MFP 200 receives an instruction from the user to perform a process in cooperation with the function provided by server 300, such as Follow-Me-Print and Scan-To-Cloud (step S2), it issues a request to mediation server 100 to access server 300 (step S3).

In the case where the state information obtained from server 300 has been stored in a memory at the time when an access request was accepted from MFP 200, mediation server 100 uses MFP 200 to notify the user about a schedule of a service discontinuation period, a schedule of a service interruption period, the state that service is currently being discontinued or interrupted, and the like (step S4). At this time, in accordance with the function of MFP 200, mediation server 100 switches the notification method between the method of displaying a view on operation panel 26 mounted in MFP 200 and other methods.

Figure 5:
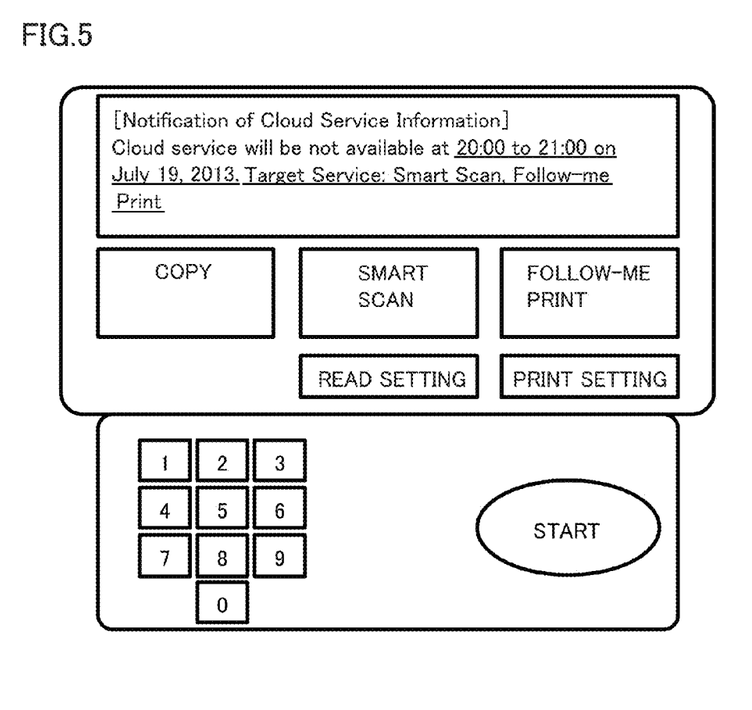
FIGS. 5 and 6 each are a diagram illustrating an example of a notification using the MFP.
Figure 6:
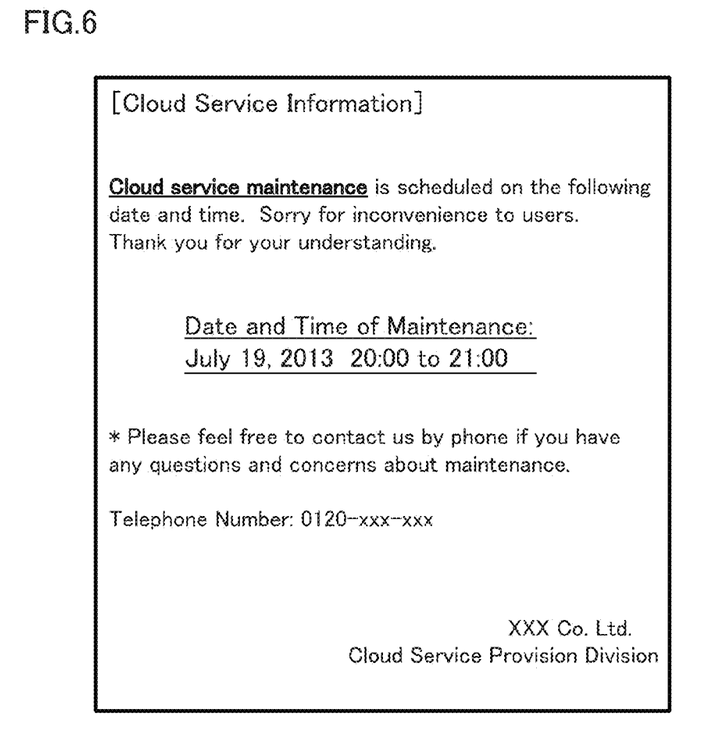

FIGS. 5 and 6 each are a diagram illustrating a specific example of notification using MFP 200. FIG. 5 shows an example in the case where a user is notified by displaying a view on operation panel 26 of MFP 200. Mediation server 100 transmits, to MFP 200, screen information of a display screen as well as a command (a control code) obtained in advance for causing MFP 200 to display a screen, thereby causing operation panel 26 to display a screen in FIG. 5.

As another example of a method of displaying a view on operation panel 26, mediation server 100 may limit a display shown on operation panel 26 of MFP 200 and related to functions available in MFP 200. Specifically, when the service from server 300 is stopped, mediation server 100 causes operation panel 26 to display such a view as to clearly indicate that any operation cannot be performed, by displaying a view differently from other buttons, for example: by not displaying a button for selecting a function for performing a process in cooperation with the function provided by server 300, such as a button for giving an instruction to upload scan data to server 300; by displaying a gray-out screen; or the like.

FIG. 6 shows an example in which the user is notified by printing paper, as an example of the method other than the method of displaying a view on operation panel 26. In this case, mediation server 100 produces a print job based on the state information, and transmits the print job to MFP 200, thereby causing MFP 200 to print the information shown in FIG. 6. By way of example, mediation server 100 stores a printing format in advance, and embeds therein information such as a discontinuation period obtained from the state information, thereby producing a print job.

Another example of the method of giving a notification to a user other than the method of displaying a view on operation panel 26 includes a method of giving a notification by lighting a lamp (not shown) of MFP 200 or sounding a buzzer (not shown) thereof in the case where mediation server 100 grasps commands in advance for lighting a lamp or sounding a buzzer. Furthermore, another example of the method of giving a notification to a user also includes a method of giving a notification to a user by transmitting an e-mail to a portable terminal or the like that is recorded in advance. Furthermore, even in the case of performing a printing process as described above, MFP 200 may print a message in a margin portion (a header portion and the like) by the latest printing operation in order to reduce consumption of printing paper. In this case, mediation server 100 may be notified by the user as to whether or not a message can be added to the latest job. Still another example of the method of giving a notification to a user may be a method of giving a notification to a user by lighting a lamp (not shown) of mediation server 100 or sounding a buzzer (not shown) thereof.

Mediation server 100 can grasp the function of MFP 200 in advance by storing the information about MFP 200 in the memory in advance or obtaining, from MFP 200, the information used for notification of the state of mediation server 100 itself, such as an MIB (Management Information Base). In other words, in the case of the latter example, by receiving an MIB from MFP 200 and analyzing the received MIB, mediation server 100 can obtain a command and the like for displaying a view on operation panel 26 of MFP 200. In this case, mediation server 100 can cause MFP 200 to display a view as shown in FIG. 5 by using the above-described command.

On the other hand, in the case where mediation server 100 cannot obtain the MIB from MFP 200 or cannot succeed in analyzing the MIB, this mediation server 100 cannot obtain the above-described command. Accordingly, in such a case, mediation server 100 notifies the user about the state of server 300 as shown in FIG. 6 by means of the method other than the display method, without displaying a view as shown in FIG. 5.

Thus, mediation server 100 changes the method of notification about the state of server 300 in accordance with such functions of MFP 200 as to whether or not targeted MFP 200 has obtained information such as an MIB, or as to whether or not the obtained information can be analyzed.

<Function Configuration>

Figure 7:
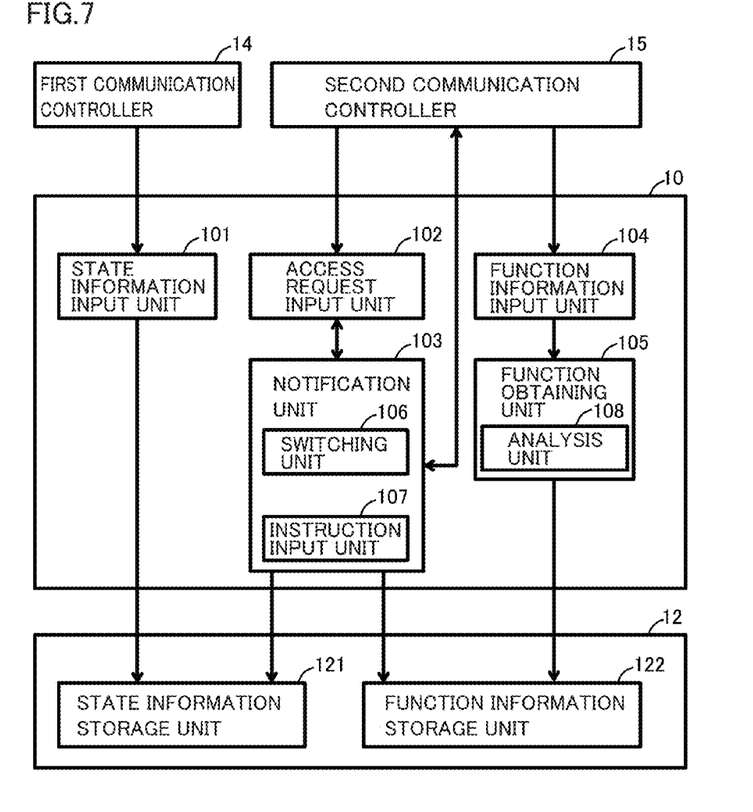
FIG. 7 is a block diagram showing an example of the function configuration of the mediation server.

FIG. 7 is a block diagram showing an example of the function configuration for performing the above-described operation by mediation server 100. Each function in FIG. 7 is implemented mainly by CPU 10 of mediation server 100 by this CPU 10 reading the program stored in ROM 11 onto RAM 12 and executing the program. However, at least a part of the function may be implemented by a hardware configuration shown in FIG. 2 or by a device configuration such as an electrical circuit that is not shown.

Referring to FIG. 7, a memory such as RAM 12 includes a state information storage unit 121 serving as a storage area in which the state information of server 300 is stored; and a function information storage unit 122 serving as a storage area in which the function information of MFP 200 such as an MIB and analysis results thereof are stored.

Further referring to FIG. 7, CPU 10 includes: a state information input unit 101 for communicating with server 300 recorded in advance and accepting an input of state information from server 300; an access request input unit 102 for accepting a request to access server 300 from MFP 200; and a notification unit 103 for giving a notification to a user using MFP 200 based on the state information of server 300. Furthermore, as an example of the function for grasping the function of MFP 200 in advance, CPU 10 includes: a function information input unit 104 for accepting an input of function information such as an MIB from MFP 200; and a function obtaining unit 105, which includes an analysis unit 108 for analyzing the function information, for obtaining a function of MFP 200 based on the analysis results.

Notification unit 103 includes a switching unit 106 for switching the notification method between a method of displaying a view on operation panel 26 and other methods in accordance with the function of MFP 200. Specifically, in the case where notification unit 103 does not have a command for causing operation panel 26 of MFP 200 to display a view, this notification unit 103 creates a document based on the state information of server 300 and causes MFP 200 to print this document, as an example of other methods. Furthermore, as a method of displaying a view on operation panel 26 of MFP 200, notification unit 103 causes operation panel 26 to display, differently from other buttons, a button for selecting a function for performing a process in cooperation with the function provided by server 300, the button being displayed on operation panel 26, based on the state information of server 300.

Access request input unit 102 may accept scan data from MFP 200 in the case where the request from MFP 200 is a request to server 300 for Scan-To-Cloud (upload of scan data). In this case, notification unit 103 may further include an instruction input unit 107 for accepting, in addition to the above-described notification, an instruction to delete the already accepted scan data if notification unit 103 has obtained the state information of MFP 200.

<Operation Flow>

Figure 8:
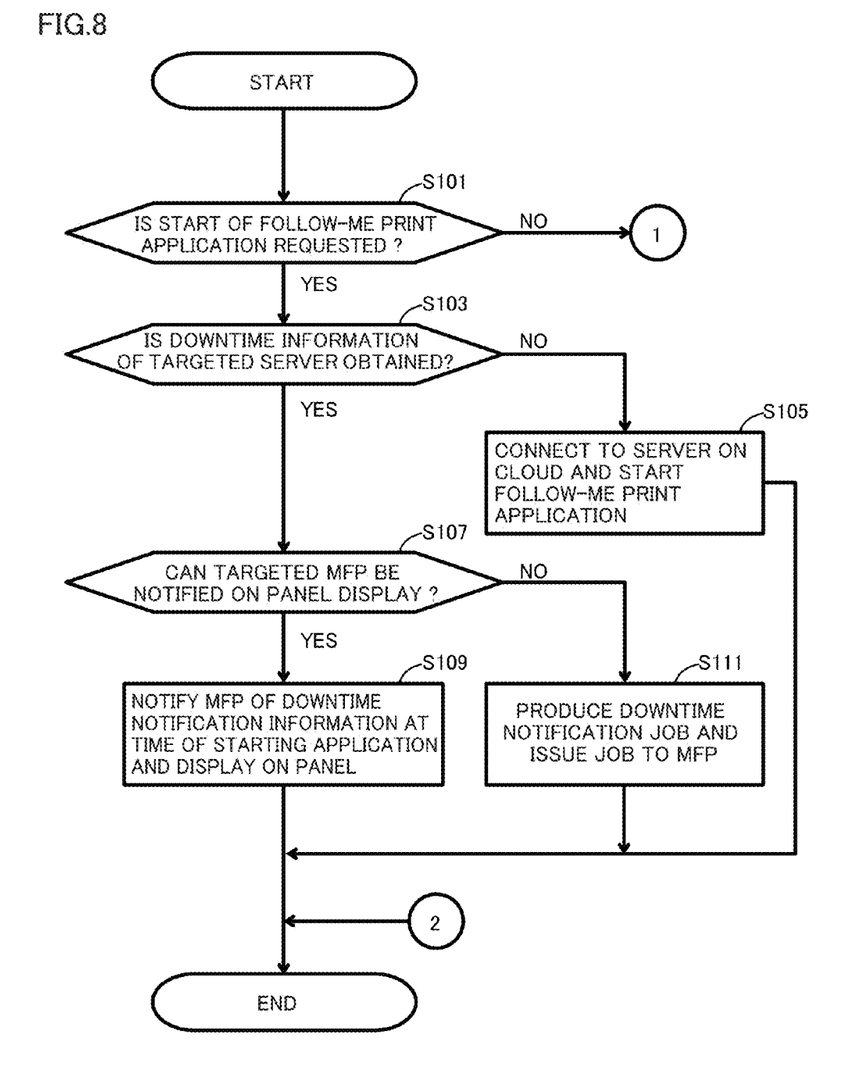
FIGS. 8 and 9 each are a flowchart illustrating an example of the flow of an operation in the mediation server.
Figure 9:
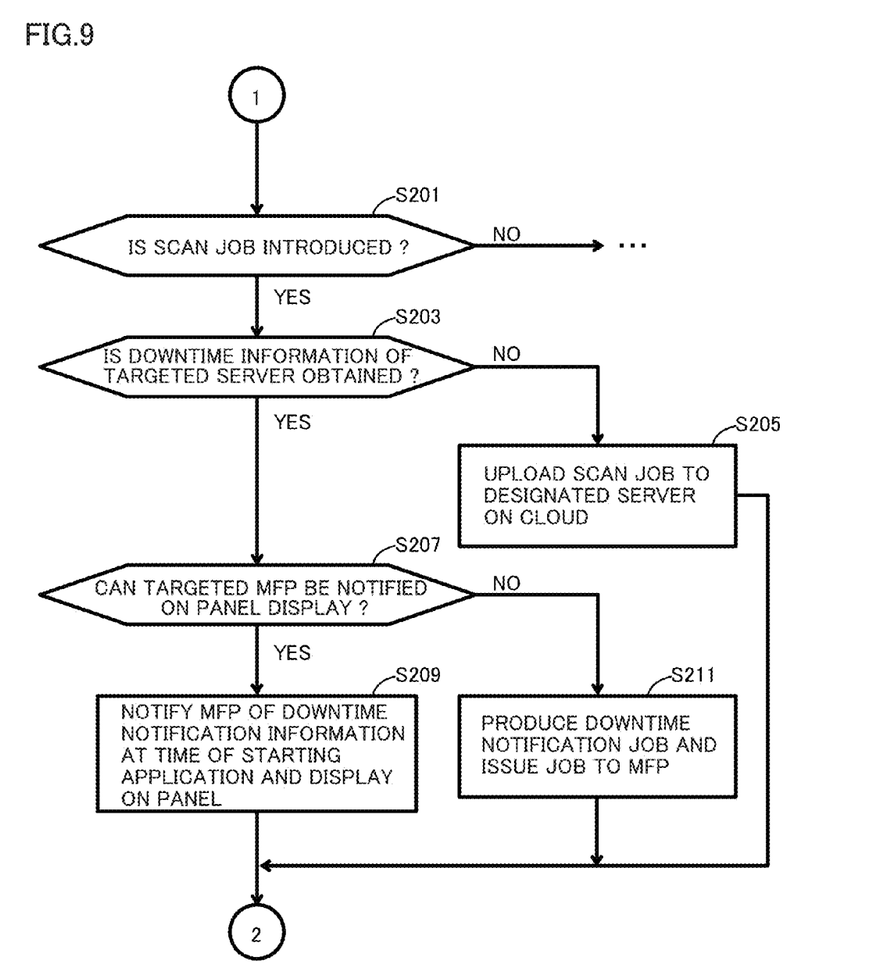

FIGS. 8 and 9 each are a flowchart illustrating the flow of an operation in mediation server 100. The operation shown in the flowchart of FIGS. 8 and 9 is implemented by CPU 11 of mediation server 100 reading a program stored in ROM 11 onto RAM 12, and executing the program to carry out each function in FIG. 7.

Referring to FIG. 8, when CPU 10 receives a request from MFP 200 to start an application for Follow-Me-Print that is a program for accessing the designated server 300, obtaining the designated document and transferring the obtained document to MFP 200 (YES in step S101), CPU 10 confirms whether the state information showing downtime and the like of targeted server 300 is stored or not in its own memory. In this case, in response to acceptance of the request described above, CPU 10 may access server 300 and confirm again whether the state information exists or not.

In the case where the state information has not been obtained from server 300 at the time when the above-described request was accepted (NO in step S103), CPU 10 determines that server 300 is not to undergo interruption or discontinuation of provision of a function such as downtime, and then, connects to server 300 in response to the above-described request to start the above-described application (step S105). Thereby, in response to the request from MFP 200, CPU 10 can obtain the designated document and transfer the obtained document to MFP 200.

On the other hand, in the case where the state information has been obtained from server 300 and stored in the memory at the time when the above-described request was accepted (YES in step S103), it turns out that server 300 is scheduled to undergo interruption or discontinuation of provision of a function such as downtime. Accordingly, CPU 10 determines that MFP 200 is used to give a notification.

At this time, CPU 10 confirms the function of MFP 200. In other words, by analyzing an MIB and the like, CPU 10 confirms whether the command serving as a control code of MFP 200 has been obtained or not. Thereby, CPU 10 can determine whether display of MFP 200 can be controlled or not.

If display on the panel of MFP 200 can be controlled (YES in step S107), CPU 10 causes operation panel 26 of MFP 200 to display a view for notifying the user about downtime and the like based on the state information of server 300 at the time when the requested application described above is started (step S109). On the other hand, if display on the panel of MFP 200 cannot be controlled (NO in step S107), CPU 10 creates a document for notifying the user of downtime and the like based on the state information of server 300, and issues the job to MFP 200 (step S111).

If the state information from MFP 200 indicates a future schedule of downtime ahead of the present point of time, CPU 10 notifies the user of the information by the display method or other methods, as described above, in the above-described step S109 or S111. In the case where the state information from MFP 200 is stored in the memory and downtime is currently occurring, CPU 10 preferably notifies the user about the schedule of downtime as well as the state where downtime is currently occurring in the above-described step S109 or S111.

CPU 10 carries out the same process also in the case where MFP 200 requests uploading of scan data to server 300. In other words, referring to FIG. 9, if Scan-To-Cloud is requested by acceptance of scan data from MFP 200 (YES in step S201), CPU 10 then confirms whether the state information indicating downtime and the like of the targeted server 300 is stored or not in its own memory. If the state information is not obtained from server 300 (NO in step S203), CPU 10 determines that server 300 is not to undergo interruption or discontinuation of provision of a function such as downtime, and then, in response to the above-described request, CPU 10 connects to server 300 to upload scan data to server 300 (step S205).

In the case where the state information has been obtained from server 300 and stored in the memory at the time when the above-described request was accepted (YES in step S203), it turns out that server 300 is scheduled to undergo interruption or discontinuation of provision of a function such as downtime. Thus, CPU 10 determines that MFP 200 is used to give a notification to the user. Then, if display on the panel of MFP 200 can be controlled (YES in step S207), CPU 10 causes operation panel 26 of MFP 200 to display a view for notifying the user about downtime and the like based on the state information of server 300 at the time when the requested application descried above is started (step S209). In this case, CPU 10 may also cause operation panel 26 to display a button for instructing deletion of the scan data that has been previously accepted, thereby accepting a delete instruction.

On the other hand, in the case where display on the panel of MFP 200 cannot be controlled (NO in step S207), CPU 10 creates a document for notifying the user about downtime and the like based on the state information of server 300, and issues the job to MFP 200 (step S211).

Effect of Embodiment

By performing the above-described operation in mediation server 100, the user who stays in the area where the system concerned is constructed (for example, in the office or the like) can get, by using MFP 200, the information such as interruption or discontinuation of provision of a function such as downtime of server 300 on the Internet. Thereby, for example, even when the user does not use a device that can be connected to the Internet such as a terminal device within the above-described area, it becomes possible for the user to accurately recognize the state of such server 300.

Conventionally, the user could obtain such information only from server 300 through the Internet using a terminal device or the like. Accordingly, when the user did not use such a terminal device, the user had to instruct MFP 200 to perform a process in cooperation with the function provided by server 300 without knowing downtime and the like of server 300. Accordingly, for example, even when the scan data that has been uploaded was actually not uploaded or even when the designated document was not obtained from server 300, the user could not find out the reason.

However, when mediation server 100 operates as described above, the user does not have to utilize a terminal device that can be connected to the Internet, but utilizes MFP 200 to become able to accurately obtain information such as downtime of server 300. Thus, the user can cope with downtime and the like.

Furthermore, mediation server 100 switches the method of giving a notification to a user between the method of displaying a view on a panel and other methods in accordance with the function of MFP 200. Accordingly, by utilizing MFP 200, the user is to be reliably notified of the state of server 300. In other words, even if display control cannot be done, for example, because MFP 200 is such a type made by another company and not supported in advance by mediation server 100, mediation server 100 can give a notification to the user by using other methods such as printing by MFP 200. Thereby, the user can recognize the state of server 300 with accuracy.

Another Example 1

In the description set forth above, as shown also in FIG. 1, the present system is assumed to include mediation server 100 as a different device that is independent of MFP 200. However, mediation server 100 may be included in one of MFPs 200. In other words, MFP 200 may have a function of mediation server 100. In this case, the function shown in FIG. 7 is to be implemented by CPU 20 of MFP 200. Accordingly, the present system can be constructed using MFP 200 having a function of mediation server 100, without having to introduce an independent device as mediation server 100.

Another Example 2

Furthermore, it is possible to provide a program for causing a computer to perform the above-described operation and to function as mediation server 100 described above. The computer includes a computer mounted in MFP 200. Accordingly, the existing computer (or MFP 200 in which a computer is mounted) can be functioned as mediation server 100, so that the present system can be simply constructed.

The above-described program can be recorded on a non-transitory computer-readable recording medium such as a flexible disk attached to the computer, a CD-ROM (Compact Disk-Read Only Memory), a ROM (Read Only Memory), a RAM (Random Access Memory), and a memory card, and thus, provided as a program product. Alternatively, the program recorded on a non-transitory recording medium such as a hard disk incorporated in a computer can be provided. Furthermore, the program can also be provided by download via a network.

In addition, the program according to the present invention may cause the process to be executed by invoking a required module in a prescribed arrangement at a prescribed timing from program modules provided as part of the operating system (OS) of the computer. In this case, the program itself does not include the above-described modules but cooperates with the OS to execute the process. The program not including the above-described modules may also be included in the program according to the present invention.

Furthermore, the program according to the present invention may be incorporated in a part of another program. Also in such a case, the program itself does not include any modules included in the above-described another program, but cooperates with another program to execute the process. The program incorporated in another program as described above may also be included in the program according to the present invention.

The program product to be provided is installed in a program storage unit such as a hard disk for execution. It is to be noted that a program product includes a program itself and a non-transitory recording medium recording the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing system constructed of an intranet and including at least one image forming apparatus that can be connected to the Internet through a mediation server, said image processing system comprising:
   wherein a hardware processor of said mediation server obtains state information from a service providing server on the Internet, said service providing server being recorded in advance;
   wherein a hardware processor of an image forming apparatus included in said image processing system requests to said mediation server according to an instruction from a user to access said service providing server on the Internet;
   wherein said hardware processor of said mediation server gives a notification using said image forming apparatus based on said state information that has already been obtained from said service providing server at a time when said request was accepted from said image forming apparatus;
   wherein said hardware processor of said mediation server obtains information related to a function of said image forming apparatus; and
   wherein in the notification, a method of said notification is switched between a method of displaying a view on a display panel mounted in said image forming apparatus and other methods not displaying on the display panel in accordance with a displaying function of said image forming apparatus based on obtained information related to the function of said image forming apparatus.

2. A mediation server for connecting the Internet and an image processing system constructed of an intranet and including at least one image forming apparatus, said mediation server comprising:
   a hardware processor configured to;
      obtain state information from a service providing server on the Internet, said service providing server being recorded in advance;
      accept a request from said image forming apparatus to access said service providing server on the Internet;
      give a notification using said image forming apparatus based on said state information that has already been obtained from said service providing server at a time when said request was accepted from said image forming apparatus; and
      obtain information related to a function of said image forming apparatus,
      wherein in the notification, a method of said notification is switched between a method of displaying a view on a display panel mounted in said image forming apparatus and other methods not displaying on the display panel in accordance with a displaying function of said image forming apparatus based on obtained information related to the function of said image forming apparatus.

3. The mediation server according to claim 2, wherein, as one of said other methods, said hardware processor creates a document based on said state information and causes said image forming apparatus to print said document when said hardware processor does not have a control code for displaying a view on said display panel of said image forming apparatus.

4. The mediation server according to claim 2, wherein, as the method of displaying a view on said display panel, said hardware processor causes said display panel to display, differently from other buttons, a button for selecting the function of said image forming apparatus related to service that said service providing server stops providing, said button being displayed on said display panel, based on said state information.

5. The mediation server according to claim 2, wherein said hardware processor further includes an instruction unit for accepting, in addition to said notification, an instruction to delete a document to be uploaded that has already been accepted, when said request is to upload the document to said service providing server.

6. An image forming apparatus including a function of the mediation server according to claim 2.

7. A notification method of giving a notification about a state of a service providing server on the Internet in an image processing system constructed of an intranet and including at least one image forming apparatus that can be connected to the Internet through a mediation server, said notification method comprising:
   obtaining, by said mediation server, state information from the service providing server on the Internet, said service providing server being recorded in advance;
   issuing a request from the image forming apparatus included in the image processing system to said mediation server according to an instruction from a user to access said service providing server on the Internet;
   giving, by said mediation server, a notification using said image forming apparatus based on said state information in a case where said state information has already been obtained from said service providing server at a time when said request was accepted from said image forming apparatus,
   obtaining information related to a function of said image forming apparatus, and
   said giving a notification comprising switching said notification method between a method of displaying a view on a display panel mounted in said image forming apparatus and other methods not displaying on the display panel in accordance with a displaying function of said image forming apparatus based on obtained information related to the function of said image forming apparatus.

8. The notification method according to claim 7, wherein, as one of said other methods, said step of giving a notification includes printing, by said image forming apparatus, a document based on said state information and created in said mediation server when said mediation server does not have a control code for displaying a view on said display panel of said image forming apparatus.

9. The notification method according to claim 7, wherein, as the method of displaying a view on said display panel, said step of giving a notification includes causing said display panel to display, differently from other buttons, a button for selecting the function of said image forming apparatus related to service that said service providing server stops providing, said button being displayed on said display panel, based on said state information.

10. The notification method according to claim 7, wherein said step of giving a notification includes the step of accepting an instruction to delete a document to be uploaded that has already been accepted, when said request is to upload the document to said service providing server.

11. The notification method according to claim 7, wherein, in said image processing system, a function of said mediation server is mounted in at least one of said image forming apparatuses.

12. A non-transitory computer-readable storage medium storing a program causing a computer to perform a process of giving a notification about a state of a service providing server on the Internet, said computer executing a mediation process for connecting the Internet and an image processing system constructed of an intranet and including at least one image forming apparatus, said program causing said computer to perform:

obtaining state information from the service providing server on the Internet, said service providing server being recorded in advance;

accepting a request from said image forming apparatus to access said service providing server on the Internet;

giving a notification using said image forming apparatus based on said state information in a case where said state information has already been obtained from said service providing server at a time when said request was accepted from said image forming apparatus, obtaining information related to a function of said image forming apparatus, and said giving a notification comprising switching a method of said notification between a method of displaying a view on a display panel mounted in said image forming apparatus and other methods not displaying on the display panel in accordance with a displaying function of said image forming apparatus based on obtained information related to the function of said image forming apparatus.

13. The non-transitory computer-readable storage medium according to claim 12, wherein, as one of said other methods, said step of giving a notification includes printing, by said image forming apparatus, a document based on said state information and created in said mediation server when said mediation server does not have a control code for displaying a view on said display panel of said image forming apparatus.

14. The non-transitory computer-readable storage medium according to claim 12, wherein, as the method of displaying a view on said display panel, said step of giving a notification includes causing said display panel to display, differently from other buttons, a button for selecting the function of said image forming apparatus related to service that said service providing server stops providing, said button being displayed on said display panel, based on said state information.

15. The non-transitory computer-readable storage medium according to claim 12, wherein said step of giving a notification includes the step of accepting an instruction to delete a document to be uploaded that has already been accepted, when said request is to upload the document to said service providing server.

16. The non-transitory computer-readable storage medium according to claim 12, wherein said computer is mounted in at least one of the image forming apparatuses.

* * * * *